No. 870,071. PATENTED NOV. 5, 1907.
S. T. WILSON.
ROTARY GRAIN SCOURER.
APPLICATION FILED DEC. 22, 1906.
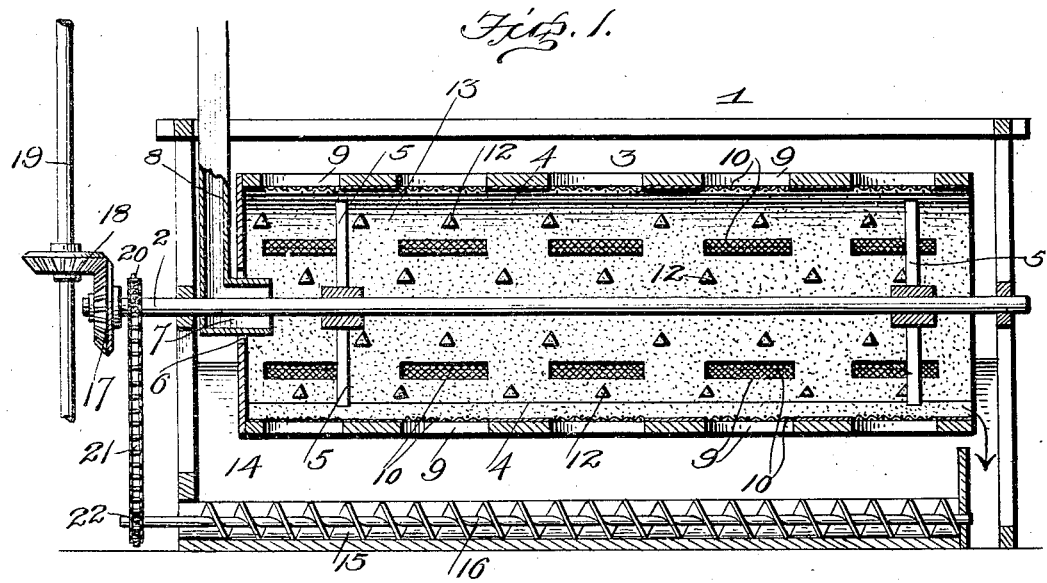
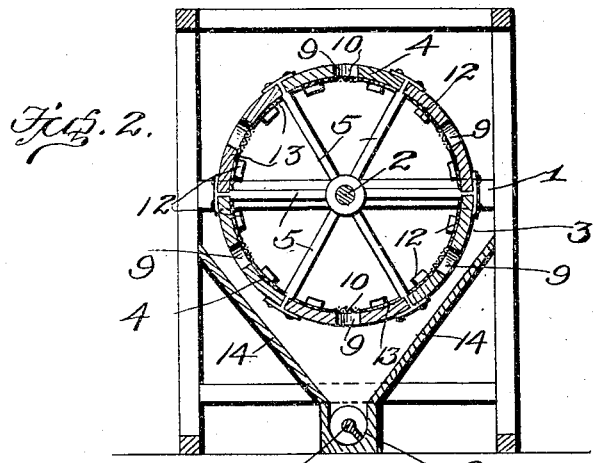
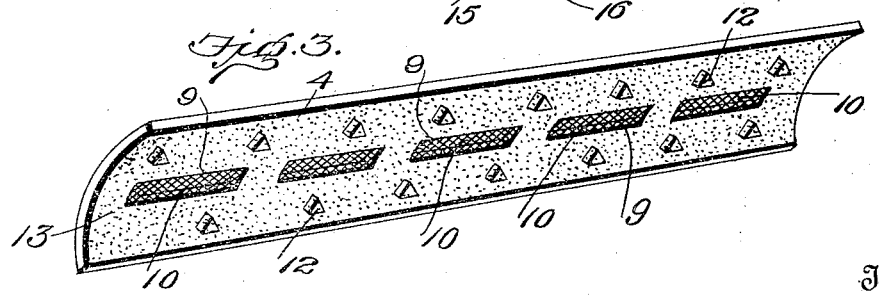
Witnesses
Inventor
Samuel T. Wilson
by
Attorneys

UNITED STATES PATENT OFFICE.

SAMUEL T. WILSON, OF CHARLESTON, WEST VIRGINIA, ASSIGNOR OF ONE-THIRD TO JACKSON CARR AND ONE-THIRD TO H. W. SENTZ, OF CHARLESTON, WEST VIRGINIA.

ROTARY GRAIN-SCOURER.

No. 870,071.      Specification of Letters Patent.      Patented Nov. 5, 1907.

Application filed December 22, 1906. Serial No. 349,179.

*To all whom it may concern:*

Be it known that I, SAMUEL T. WILSON, a citizen of the United States, residing at Charleston, in the county of Kanawha and State of West Virginia, have invented certain new and useful Improvements in Rotary Grain-Scourers; and I do declare the following to be a full, clear, and exact description of the invention, such as will enable others skilled in the art to which it appertains to make and use the same.

This invention relates to improvements in rotary grain scourers.

The object of the invention is to provide a grain scourer of this character having means whereby the grain passing therethrough will be thoroughly cleaned and means to convey the scourings and other matter removed from the grain to a suitable place of deposit.

With the foregoing and other objects in view, the invention consists of certain novel features of construction, combination and arrangement of parts, as will be hereinafter described and claimed.

In the accompanying drawings, Figure 1 is a vertical longitudinal sectional view of a grain scourer constructed in accordance with the invention; Fig. 2 is a vertical cross-sectional view of the same; and Fig. 3 is a detail perspective view of one of the sections of the cleaning cylinder.

Referring more particularly to the drawings, 1 denotes the supporting frame of the machine in which is revolubly mounted a cylinder shaft 2 on which is arranged a cleaning cylinder 3. The cylinder 3 is preferably formed of a plurality of segmental sections 4 which are suitably bolted or otherwise secured together. The cylinder is supported upon the shaft 2 by radially disposed arms or braces 5 arranged on the shaft between the ends of the cylinder. The cylinder 3 is preferably closed at its forward end and in said closed end is formed a centrally disposed feed opening 6 into which is adapted to project a lower right-angularly formed open end 7 of a feed chute 8 which is arranged in the forward end of the frame, as shown. The rear or opposite end of the cylinder is preferably left open for the discharge of the cleaned grain therefrom, said grain in falling from the open end of the cylinder being received by a suitable receptacle not shown.

Each of the sections of the cylinder is preferably formed with a series of longitudinally disposed slots 9 arranged through the center of the same. Each of the slots 9 is covered with a screen 10 through which the scourings and other matter removed from the grain is adapted to pass. On the inner side of the sections 4 of the cylinders are secured a series of radially projecting wedge-shaped blocks 12 which are preferably arranged in longitudinal rows on each side of the row of slots 9 in said sections. The blocks 12 of one row are preferably arranged opposite the spaces between the blocks of the other row, as clearly shown in Fig. 3 of the drawings.

The inner side of each of the sections 4 of the cylinder are preferably covered with an abrasive material 13, said material being preferably in the form of emery or fine scouring sand and preferably applied to the sections by first gluing to the inner side thereof a suitable fabric, such as canvas or ducking which is afterwards coated with glue and sanded with emery or other suitable abrasive material. The outer sides of the blocks 12 are also covered with an abrasive material similar to that used on the inner side of the sections 4. The blocks 12 are provided to increase the scouring surface of the cylinder and to form stirring devices by means of which the grain is more readily distributed over the interior surface of the cylinder while passing therethrough.

Arranged in the frame 1 below the cylinder are inclined guide-boards 14 which are connected at their lower ends with a centrally disposed trough 15 in which is revolubly mounted a spiral conveyer 16. The scourings and other material removed from the grain passes through the screened slots 9 in the cylinder and falls on to the guide-boards 14 which conduct the same to the trough 15 from which it is removed by the conveyer 16 to a suitable place of deposit.

On the forward end of the shaft 2 is mounted a beveled gear wheel 17 which is engaged by a similar gear 18 on a suitably supported drive shaft 19 whereby the cylinder is revolved. On the forward end of the shaft 2 adjacent to the inner side of the gear 17 is mounted a sprocket wheel 20 which is connected by a sprocket chain 21 with a sprocket pinion 22 on the forward end of the shaft on the conveyer 16 whereby motion is imparted to said conveyer from the cylinder shaft.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined by the appended claims.

Having thus described my invention, what I claim as new and desire to secure by Letters Patent, is:—

In a rotary grain scourer, a supporting frame, a shaft journaled for rotation therein, a scouring cylinder fixed upon and for rotation with the shaft and comprising a plurality of connected segmental sections, said cylinder being provided with screened discharge openings and having one of its ends wholly open and its other end closed by a head having a central inlet opening, a series of triangular projections arranged at spaced intervals over the inner surface of the cylinder, and serving to spread the material within the latter, a fabric covering applied over the whole inner surface of the cylinder, and having a coating of abrasive material, a feed chute having an angularly disposed portion projected into said inlet opening and arranged concentric with the shaft, and means for driving the latter.

In testimony whereof I have hereunto set my hand in presence of two subscribing witnesses.

SAMUEL T. WILSON.

Witnesses:
D. F. HOSTETLER,
BERT W. WILSON.